United States Patent
Suzuki et al.

(10) Patent No.: US 8,906,492 B2
(45) Date of Patent: Dec. 9, 2014

(54) FORMED ARTICLE, METHOD FOR PRODUCING THE FORMED ARTICLE, MEMBER FOR ELECTRONIC DEVICE, AND ELECTRONIC DEVICE

(75) Inventors: Yuta Suzuki, Tokyo (JP); Takeshi Kondo, Tokyo (JP); Shinichi Hoshi, Kawagoe (JP)

(73) Assignee: LINTEC Corporation, Tokyo (JP)

( * ) Notice: Subject to any disclaimer, the term of this patent is extended or adjusted under 35 U.S.C. 154(b) by 373 days.

(21) Appl. No.: 13/201,003

(22) PCT Filed: Mar. 16, 2010

(86) PCT No.: PCT/JP2010/054414
§ 371 (c)(1),
(2), (4) Date: Nov. 14, 2011

(87) PCT Pub. No.: WO2010/107018
PCT Pub. Date: Sep. 23, 2010

(65) Prior Publication Data
US 2012/0064321 A1  Mar. 15, 2012

(30) Foreign Application Priority Data
Mar. 17, 2009  (JP) .................. 2009-063779

(51) Int. Cl.
B32B 7/02 (2006.01)
C08J 7/12 (2006.01)
C08J 7/04 (2006.01)

(52) U.S. Cl.
CPC .............. *C08J 7/123* (2013.01); *C08J 2483/00* (2013.01); *C08J 2483/16* (2013.01); *C08J 2367/03* (2013.01); *C08J 7/047* (2013.01)
USPC ........... 428/212; 428/451; 427/489; 427/496; 427/503; 427/525; 427/527

(58) Field of Classification Search
CPC ....................................... C08J 7/047
USPC .......... 428/212, 451; 427/489, 496, 503, 525, 427/527
See application file for complete search history.

(56) References Cited

U.S. PATENT DOCUMENTS 5,747,623 A  5/1998 Matsuo et al.
2008/0138611 A1* 6/2008 Yasuzawa et al. ............ 428/336
(Continued)

FOREIGN PATENT DOCUMENTS

EP  2397324 A1  12/2011
JP  63-111167 A  5/1988
(Continued)

OTHER PUBLICATIONS

International Search Report for PCT/JP2010/054414, mailed on Jun. 15, 2010.
(Continued)

*Primary Examiner* — Aaron Austin
*Assistant Examiner* — Lawrence Ferguson
(74) *Attorney, Agent, or Firm* — Birch, Stewart, Kolasch & Birch, LLP (57) ABSTRACT

A formed article includes a gas barrier layer that is formed of a material including at least an oxygen atom and a silicon atom, a surface area of the gas barrier layer having an oxygen atom content rate of 60 to 75%, a nitrogen atom content rate of 0 to 10%, and a silicon atom content rate of 25 to 35%, based on the total content of oxygen atoms, nitrogen atoms, and silicon atoms, and having a film density of 2.4 to 4.0 g/cm$^3$. A method of producing a formed article includes implanting ions into a surface layer part of a polysilazane compound-containing layer of a formed body that includes the polysilazane compound-containing layer in its surface layer part. An electronic device member includes the formed article. An electronic device includes the electronic device member. The formed article exhibits an excellent gas barrier capability, excellent folding resistance, and excellent transparency.

13 Claims, 2 Drawing Sheets

(56) References Cited

U.S. PATENT DOCUMENTS

2009/0017597 A1    1/2009   Zhao et al.
2009/0148633 A1*   6/2009   Inagaki et al. ............... 428/34.1

FOREIGN PATENT DOCUMENTS

| JP | 2-250953 A    | 10/1990 |
| JP | 6-122852 A    | 5/1994  |
| JP | 8-112879 A    | 5/1996  |
| JP | 10-34790 A    | 2/1998  |
| JP | 10-212114 A   | 8/1998  |
| JP | 10-279362 A   | 10/1998 |
| JP | 2000-246830 A | 9/2000  |
| JP | 2000-338901 A | 12/2000 |
| JP | 2003-211575 A | 7/2003  |
| JP | 2005-131853 A | 5/2005  |
| JP | 2007-237588 A | 9/2007  |

OTHER PUBLICATIONS

Extended European Search Report dated Jul. 12, 2013, for European patent application No. 13160593.3.

Extended European Search Report dated Aug. 2, 2012, for European Application No. 10753510.6.

Ohishi, "Gas barrier characteristics of a polysilazane film formed on an ITO-coated PET substrate", Journal of Non-Crystalline Solids, vol. 330, 2003, pp. 248-251.

* cited by examiner

FORMED ARTICLE, METHOD FOR PRODUCING THE FORMED ARTICLE, MEMBER FOR ELECTRONIC DEVICE, AND ELECTRONIC DEVICE

TECHNICAL FIELD

The present invention relates to a formed article, a method of producing the same, an electronic device member that includes the formed article, and an electronic device that includes the electronic device member.

BACKGROUND ART

A polymer formed article such as a plastic film is inexpensive and exhibits excellent workability. Therefore, such a polymer formed article is provided with a desired function, and used in various fields.

For example, a gas barrier plastic film that prevents permeation of water vapor and oxygen is used as a food/drug packaging film in order to suppress oxidation and denaturation of proteins, oils, fats, and the like to keep the taste and freshness.

In recent years, use of a transparent plastic film as an electrode substrate instead of a glass sheet has been proposed for displays (e.g., liquid crystal display and electroluminescence (EL) display) in order to implement a reduction in thickness, a reduction in weight, an increase in flexibility, and the like. However, since a plastic film tends to allow water vapor, oxygen, and the like to pass through as compared with a glass sheet, the elements provided in the display may deteriorate.

In order to solve this problem, Patent Document 1 discloses a flexible display substrate in which a transparent gas barrier layer formed of a metal oxide is stacked on a transparent plastic film.

However, since the transparent gas barrier layer formed of a metal oxide is stacked on the surface of the transparent plastic film by vapor deposition, ion plating, sputtering, or the like, cracks may occur in the gas barrier layer when the substrate is rounded or folded, so that the gas barrier capability may deteriorate.

Patent Document 2 discloses a method of producing a gas barrier film that includes forming a polysilazane film on at least one side of a film, and subjecting the polysilazane film to a plasma treatment. However, this method has a problem in that a sufficient gas barrier capability cannot be obtained if the thickness of the gas barrier layer is not of the order of micrometers. For example, Patent Document 2 discloses that the water vapor transmission rate is 0.50 g/m$^2$/day when the gas barrier layer has a thickness of 0.1 μm.

RELATED-ART DOCUMENT

Patent Document

Patent Document 1: JP-A-2000-338901
Patent Document 2: JP-A-2007-237588

SUMMARY OF THE INVENTION

Problems to be Solved by the Invention

The invention was conceived in view of the above situation. An object of the invention is to provide a formed article that exhibits an excellent gas barrier capability and excellent transparency, a method of producing the formed article, an electronic device member that includes the formed article, and an electronic device that includes the electronic device member.

Means for Solving the Problems

The inventors of the invention conducted extensive studies in order to achieve the above object. As a result, the inventors found that a formed article that includes a gas barrier layer that is formed of a material including at least an oxygen atom and a silicon atom, the surface layer part of the gas barrier layer having an oxygen atom content, a nitrogen atom content, and a silicon atom content within a specific range, and having a film density of 2.4 to 4.0 g/cm$^3$, exhibits an excellent gas barrier capability, excellent folding resistance, and excellent transparency, and a formed article that exhibits an excellent gas barrier capability, excellent folding resistance, and excellent transparency can be easily and efficiently produced by implanting ions into a polysilazane compound-containing layer. This finding has led to the completion of the invention.

A first aspect of the invention provides the following formed article (see (1) to (6)).

(1) A formed article including a gas barrier layer that is formed of a material including at least an oxygen atom and a silicon atom, a surface layer part of the gas barrier layer having an oxygen atom content rate of 60 to 75%, a nitrogen atom content rate of 0 to 10%, and a silicon atom content rate of 25 to 35%, based on the total content of oxygen atoms, nitrogen atoms, and silicon atoms, and having a film density of 2.4 to 4.0 g/cm$^3$.

(2) A formed article including a layer obtained by implanting ions into a polysilazane compound-containing layer.

(3) The formed article according to (2), wherein the ions have been obtained by ionizing at least one gas selected from the group consisting of hydrogen gas, nitrogen gas, oxygen gas, argon gas, helium gas, neon gas, xenon gas, and krypton gas.

(4) The formed article according to (2) or (3), wherein the layer is obtained by subjecting the polysilazane compound-containing layer to plasma ion implantation.

(5) The formed article according to any one of (1) to (4), wherein the polysilazane compound is a perhydropolysilazane.

(6) The formed article according to any one of (1) to (5), the formed article having a water vapor transmission rate at a temperature of 40° C. and a relative humidity of 90% of less than 0.50 g/m$^2$/day.

A second aspect of the invention provides the following method of producing a formed article (see (7) to (10)).

(7) A method of producing the formed article according to (2), the method including implanting ions into a surface area of a polysilazane compound-containing layer of a formed body that includes the polysilazane compound-containing layer in its surface area.

(8) The method according to (7), including subjecting a polysilazane compound-containing layer of a formed body that includes the polysilazane compound-containing layer in its surface area to ion implantation using at least one gas selected from the group consisting of hydrogen gas, nitrogen gas, oxygen gas, argon gas, helium gas, neon gas, xenon gas, and krypton gas.

(9) The method according to (7), including subjecting a polysilazane compound-containing layer of a formed body that includes the polysilazane compound-containing layer in its surface area to plasma ion implantation using at least one gas selected from the group consisting of hydrogen gas, nitrogen gas, oxygen gas, argon gas, helium gas, neon gas, xenon gas, and krypton gas.

(10) The method according to (7), including implanting ions into a polysilazane compound-containing layer while transferring a long formed body that includes the polysilazane compound-containing layer in its surface area in a given direction.

A third aspect of the invention provides the following electronic device member (see (11)).

(11) An electronic device member including the formed article according to any one of (1) to (6).

A fourth aspect of the invention provides the following electronic device (see (12)).

(12) An electronic device including the electronic device member according to (11).

Effects of the Invention

The formed article exhibits an excellent gas barrier capability, excellent folding resistance, and excellent transparency. Therefore, the formed article may suitably be used as an electronic device member (e.g., solar battery backsheet) for flexible displays, solar batteries, and the like.

The method of producing a formed article can safely and easily produce the formed article that exhibits an excellent gas barrier capability. Moreover, an increase in area can be easily achieved at low cost as compared with an inorganic film deposition.

Since the electronic device member exhibits an excellent gas barrier capability and excellent transparency, the electronic device member may suitably be used for electronic devices such as displays and solar batteries.

DESCRIPTION OF EXEMPLARY EMBODIMENTS

A formed article, a method of producing a formed article, an electronic device member, and an electronic device according to embodiments of the invention are described in detail in below.

1) Formed Article

A formed article according to one embodiment of the invention includes a gas barrier layer that is formed of a material including at least an oxygen atom and a silicon atom, a surface layer part of the gas barrier layer having an oxygen atom content rate of 60 to 75%, a nitrogen atom content rate of 0 to 10%, and a silicon atom content rate of 25 to 35%, based on the total content of oxygen atoms, nitrogen atoms, and silicon atoms, and having a film density of 2.4 to 4.0 g/cm³.

Gas Barrier Layer

The formed article according to one embodiment of the invention includes the gas barrier layer (a) that is formed of a material including at least an oxygen atom and a silicon atom, (b) the surface layer part of the gas barrier layer having an oxygen atom content rate of 60 to 75% (preferably 63 to 70%), a nitrogen atom content rate of 0 to 10% (preferably 0.1 to 6%), and a silicon atom content rate of 25 to 35% (preferably 29 to 32%), based on the total content of oxygen atoms, nitrogen atoms, and silicon atoms, and (c) the surface layer part of the gas barrier layer having a film density of 2.4 to 4.0 g/cm³.

The gas barrier layer may be a layer obtained by implanting ions into a polysilazane compound-containing layer as described later, for example.

The term "surface layer part" of the gas barrier layer used herein refers to the surface of the gas barrier layer and an area of the gas barrier layer having a depth of 5 nm or less from the surface of the gas barrier layer. The term "surface" of the gas barrier layer used herein is intended to include the interface with another layer.

The oxygen atom content rate, the nitrogen atom content rate, and the silicon atom content rate in the surface layer part are measured by the method described in connection with the examples.

The film density is calculated by X-ray reflectometry (XRR).

X-rays incident on a thin film on a substrate at a very low angle are totally reflected. When the incident angle of the X-rays is equal to or higher than the total reflection critical angle, the X-rays enter the thin film, and are divided into transmitted waves and reflected waves at the surface and the interface of the thin film, and the reflected waves undergo interference. The film density can be determined by analyzing the total reflection critical angle. The thickness of the thin film can also be determined by performing measurement while changing the incident angle, and analyzing an interference signal of reflected waves due to a change in optical path difference.

The film density may be measured by the following method.

The refractive index n of a substance when applying X-rays, and the real part δ of the refractive index n are normally given by the following expressions 1 and 2.

[Expression 1]

$$n = 1 - \delta - i\beta \quad (1)$$

[Expression 2]

$$\delta = \left(\frac{r_e \lambda^2}{2\pi}\right) N_0 \rho \sum_i x_i (Z_i + f_i') \bigg/ \sum_i x_i M_i \quad (2)$$

where, $r_e$ is the electron classical radius ($2.818 \times 10^{-15}$ m), $N_0$ is the Avogadro's number, λ is the wavelength of X-rays, ρ is the density (g/cm³), Zi, Mi, and xi respectively are the atomic number, the atomic weight, and the atomic number ratio (molar ratio) of the ith atom, and fi' is the atomic scattering factor of atoms (abnormal dispersion term) of the ith atom. The total reflection critical angle θc is given by the following expression 3 when disregarding β that relates to absorption.

[Expression 3]

$$\theta c = \sqrt{2\delta} \quad (3)$$

Therefore, the density ρ is calculated by the following expression 4 based on the relationship between the expressions 2 and 3.

[Expression 4]

$$\rho = \frac{\theta_c^2 \sum_i x_i M_i}{\left(\frac{r_e \lambda^2}{\pi}\right) N_0 \sum_i x_i (Z_i + f_i')} \quad (4)$$

The total reflection critical angle θc can be calculated from the X-ray reflectivity, the electron classical radius $r_e$, Avogadro's number $N_0$, and the wavelength $\lambda$ are constants, and the atomic number Zi, the atomic weight Mi, and the atomic scattering factor fi' are inherent to the constituent atom. A value obtained by XPS measurement is used as the atomic number ratio xi (molar ratio).

The film density of the surface layer part of the gas barrier layer is measured by the method described in connection with the examples, and determined using the expression 4.

The formed article according to one embodiment of the invention may include a layer (hereinafter may be referred to as "ion-implanted layer") obtained by implanting ions into a polysilazane compound-containing layer (hereinafter may be referred to as "polysilazane layer"). The layer obtained by implanting ions into the polysilazane layer functions as a gas barrier layer.

It is preferable that the ion-implanted layer satisfy the above requirements (a) to (c).

The polysilazane used in connection with the invention is a polymer that includes a repeating unit including an —Si—N— bond in the molecule. Specific examples of the polysilazane include a compound that includes a repeating unit shown by the following formula (1).

[Chemical Formula 1]

(1)

In the formula (1), n is an arbitrary natural number.

Rx, Rx, and Rz individually represent a hydrogen atom or a non-hydrolyzable group such as a substituted or unsubstituted alkyl group, a substituted or unsubstituted cycloalkyl group, a substituted or unsubstituted alkenyl group, a substituted or unsubstituted aryl group, or an alkylsilyl group.

Examples of the alkyl group of the substituted or unsubstituted alkyl group include alkyl groups having 1 to 10 carbon atoms (e.g., methyl group, ethyl group, n-propyl group, isopropyl group, n-butyl group, isobutyl group, sec-butyl group, t-butyl group, n-pentyl group, isopentyl group, neopentyl group, n-hexyl group, n-heptyl group, and n-octyl group).

Examples of the cycloalkyl group of the substituted or unsubstituted cycloalkyl group include cycloalkyl groups having 3 to 10 carbon atoms (e.g., cyclobutyl group, cyclopentyl group, cyclohexyl group, and cycloheptyl group).

Examples of the alkenyl group of the substituted or unsubstituted alkenyl group include alkenyl groups having 2 to 10 carbon atoms (e.g., vinyl group, 1-propenyl group, 2-propenyl group, 1-butenyl group, 2-butenyl group, and 3-butenyl group).

Examples of a substituent for the alkyl group, the cycloalkyl group, and the alkenyl group include halogen atoms such as a fluorine atom, a chlorine atom, a bromine atom, and an iodine atom; a hydroxyl group; a thiol group; an epoxy group; a glycidoxy group; a (meth)acryloyloxy group; substituted or unsubstituted aryl groups such as a phenyl group, a 4-methylphenyl group, and a 4-chlorophenyl group; and the like.

Examples of the aryl group of the substituted or unsubstituted aryl group include aryl groups having 6 to 10 carbon atoms (e.g., phenyl group, 1-naphthyl group, and 2-naphthyl group).

Examples of a substituent for the aryl group include halogen atoms such as a fluorine atom, a chlorine atom, a bromine atom, and an iodine atom; alkyl groups having 1 to 6 carbon atoms, such as a methyl group and an ethyl group; alkoxy groups having 1 to 6 carbon atoms, such as a methoxy group and an ethoxy group; a nitro group; a cyano group; a hydroxyl group; a thiol group; an epoxy group; a glycidoxy group; a (meth)acryloyloxy group; substituted or unsubstituted aryl groups such as a phenyl group, a 4-methylphenyl group, and a 4-chlorophenyl group; and the like.

Examples of the alkylsilyl group include a trimethylsilyl group, a triethylsilyl group, a triisopropylsilyl group, a tri-t-butylsilyl group, a methyldiethylsilyl group, a dimethylsilyl group, a diethylsilyl group, a methylsilyl group, an ethylsilyl group, and the like.

Among these, a hydrogen atom, an alkyl group having 1 to 6 carbon atoms, or a phenyl group is preferable as Rx, Ry, and Rz. A hydrogen atom is particularly preferable as Rx, Ry, and Rz.

The polysilazane compound that includes the repeating unit shown by the formula (1) may be an inorganic polysilazane in which Rx, Ry, and Rz represent hydrogen atoms, or an organic polysilazane in which at least one of Rx, Ry, and Rz does not represent a hydrogen atom.

Examples of the inorganic polysilazane include a perhydropolysilazane that has a linear structure including a repeating unit shown by the following formula, has a molecular weight of 690 to 2000, and includes 3 to 10 $SiH_3$ groups in one molecule (see JP-B-63-16325),

[Chemical Formula 2]

wherein a is an arbitrary natural number, a perhydropolysilazane that has a linear structure and a branched structure, and includes a repeating unit shown by the following formula (A),

[Chemical Formula 3]

(A)

wherein b and c are arbitrary natural numbers, and $Y^1$ represents a hydrogen atom or a group shown by the following formula (B),

[Chemical Formula 4]

(B)

wherein d is an arbitrary natural number, * indicates the bonding position, and $Y^2$ represents a hydrogen atom or a group shown by the formula (B), a perhydropolysilazane that has a linear structure, a branched structure, and a cyclic structure in the molecule, and includes a perhydropolysilazane structure shown by the following formula (C),

[Chemical Formula 5]

(C)

and the like.

Examples of the organic polysilazane include
(i) a polysilazane that includes a repeating unit shown by -(Rx'SiHNH)— (wherein Rx' represents a substituted or unsubstituted alkyl group, a substituted or unsubstituted cycloalkyl group, a substituted or unsubstituted alkenyl group, a substituted or unsubstituted aryl group, or an alkylsilyl group; hereinafter the same), and has a cyclic structure having a degree of polymerization of 3 to 5,
(ii) a polysilazane that includes a repeating unit shown by -(Rx'SiHNRz')- (wherein Rz' represents a substituted or unsubstituted alkyl group, a substituted or unsubstituted cycloalkyl group, a substituted or unsubstituted alkenyl group, a substituted or unsubstituted aryl group, or an alkylsilyl group), and has a cyclic structure having a degree of polymerization of 3 to 5,
(iii) a polysilazane that includes a repeating unit shown by -(Rx'Ry'SiNH)— (wherein Ry' represents a substituted or unsubstituted alkyl group, a substituted or unsubstituted cycloalkyl group, a substituted or unsubstituted alkenyl group, a substituted or unsubstituted aryl group, or an alkylsilyl group), and has a cyclic structure having a degree of polymerization of 3 to 5,
(iv) a polyorgano(hydro)silazane that includes a structure shown by the following formula in the molecule,

[Chemical Formula 6]

R = CH₃

(v) a polysilazane that includes a repeating unit shown by the following formula,

[Chemical Formula 7]

wherein Rx' and Ry' are the same as defined above, e and f are arbitrary natural numbers, and $Y_3$ represents a hydrogen atom or a group shown by the following formula (E),

[Chemical Formula 8]

(E)

wherein g is an arbitrary natural number, * indicates the bonding position, and $Y^4$ represents a hydrogen atom or a group shown by the formula (E), and the like.

The above organic polysilazane may be produced by a known method. For example, the above organic polysilazane may be produced by reacting ammonia or a primary amine with a reaction product of a substituted or unsubstituted halogenosilane compound shown by the following formula (2) and a secondary amine.

[Chemical Formula 9]

$$R^1_{4-m}SiX_m \qquad (2)$$

wherein m is 2 or 3, X represents halogen atom, and $R^1$ represents a substituent for Rx, Ry, Rz, Rx', Ry', or Rz'.

The secondary amine, ammonia, and the primary amine may be appropriately selected depending on the structure of the target polysilazane compound.

A modified polysilazane may be used as the polysilazane compound. Examples of the modified polysilazane include a polymetallosilazane that includes a metal atom (which may be crosslinked), a polysiloxazane that includes a repeating unit shown by $(SiH_2)_g(NH)_h)$ and a repeating unit shown by $(SiH_2)_iO$ (wherein g, h, and i are individually 1, 2, or 3) (see JP-A-62-195024), a polyborosilazane produced by reacting a polysilazane with a boron compound (see JP-A-2-84437), a polymetallosilazane produced by reacting a polysilazane with a metal alkoxide (see JP-A-63-81122, for example), an inorganic silazane polymer and a modified polysilazane (see JP-A-1-138108, for example), a copolymer silazane produced by introducing an organic component into a polysilazane (JP-A-2-175726, for example), a low-temperature ceramic polysilazane obtained by adding a ceramic-forming catalyst compound to a polysilazane (see JP-A-5-238827, for example), a silicon alkoxide-addition polysilazane (see JP-A-5-238827), a glycidole-addition polysilazane (see JP-A-6-122852), an acetylacetonate complex-addition polysilazane (see JP-A-6-306329), a metal carboxylate-addition polysilazane (see JP-A-6-299118, for example), a polysilazane composition produced by adding an amine and/or an acid to the above polysilazane or modified polysilazane (see JP-A-9-31333), a modified polysilazane produced by adding an alcohol (e.g., methanol) or hexamethyldisilazane to the terminal nitrogen (N) atom of a perhydropolysilazane (see JP-A-5-345826 and JP-A-4-63833), and the like.

The polysilazane compound used in connection with the invention is preferably an inorganic polysilazane in which Rx, Ry, and Rz represent hydrogen atoms, or an organic polysilazane in which at least one of Rx, Ry, and Rz does not represent a hydrogen atom, and more preferably an inorganic polysilazane from the viewpoint of availability and a capability to form an implanted layer that exhibits an excellent gas barrier capability.

The number average molecular weight of the polysilazane compound is not particularly limited, but is preferably 100 to 50,000.

A product commercially available as a glass coating material or the like may be used as the polysilazane compound.

The polysilazane compound-containing layer may include a component other than the polysilazane compound insofar as the object of the invention can be achieved. Examples of a component other than the polysilazane compound include a curing agent, another polymer, an aging preventive, a light stabilizer, a flame retardant, and the like.

The content of the polysilazane compound in the polysilazane compound-containing layer is preferably 50 wt % or more, and more preferably 70 wt % or more, from the viewpoint of obtaining an ion-implanted layer that exhibits an excellent gas barrier capability.

The polysilazane compound-containing layer may be formed by an arbitrary method. For example, the polysilazane compound-containing layer may be formed by applying a solution that includes at least one polysilazane compound, an optional component, and a solvent to an appropriate substrate layer, and drying the resulting film.

A spin coater, a knife coater, a gravure coater, or the like may be used as the coating apparatus.

It is preferable to heat the film when drying the film in order to improve the gas barrier capability of the resulting formed article. In this case, the film is heated at 80 to 150° C. for several tens of seconds to several tens of minutes.

The polysilazane compound-containing layer may also be formed by causing gas of a plasma-polymerizable silazane compound (e.g., dimethyldisilazane, tetramethyldisilazane, or hexamethyldisilazane) to come in contact with a molded plastic, and performing plasma polymerization (see JP-A-9-143289).

The thickness of the polysilazane compound-containing layer is not particularly limited, but is normally 20 nm to 100 µm, preferably 30 nm to 500 nm, and more preferably 40 nm to 200 nm According to the invention, a formed article that exhibits a sufficient gas barrier capability can be obtained even if the thickness of the polysilazane compound-containing layer is of the order of nanometers.

The ion-implanted layer of the formed article according to one embodiment of the invention is not particularly limited insofar as the ion-implanted layer is a layer which includes at least one polysilazane compound and into which ions are implanted.

The dose may be appropriately determined depending on the usage of the resulting formed article (e.g., gas barrier capability and transparency), and the like.

Examples of the ions implanted include rare gases such as argon, helium, neon, krypton, and xenon; ions of fluorocarbons, hydrogen, nitrogen, oxygen, carbon dioxide, chlorine, fluorine, sulfur, and the like; ions of metals such as gold, silver, copper, platinum, nickel, palladium, chromium, titanium, molybdenum, niobium, tantalum, tungsten, and aluminum; and the like.

Among these, at least one ion selected from the group consisting of ions of hydrogen, nitrogen, oxygen, argon, helium, neon, xenon, and krypton is preferable due to ease of implantation and a capability to form an ion-implanted layer that exhibits an excellent gas barrier capability and excellent transparency.

The dose may be appropriately determined depending on the usage of the resulting formed article (e.g., gas barrier capability and transparency), and the like.

The ion implantation method is not particularly limited. For example, a method that includes forming a polysilazane compound-containing layer, and implanting ions into the polysilazane compound-containing layer may be used.

Ions may be implanted by applying ions (ion beams) accelerated by an electric field, implanting ions present in plasma, or the like. It is preferable to use a plasma ion implantation method since a gas barrier formed article can be easily obtained.

Plasma ion implantation may be implemented by generating plasma in an atmosphere containing a plasma-generating gas (e.g., rare gas), and implanting ions (cations) in the plasma into the surface area of the polysilazane compound-containing layer by applying a negative high-voltage pulse to the polysilazane compound-containing layer, for example.

The thickness of the ion-implanted layer may be controlled depending on the implantation conditions (e.g., type of ion, applied voltage, and implantation time), and may be determined depending on the thickness of the polysilazane compound-containing layer, the application (object) of the formed article, and the like. The thickness of the ion-implanted layer is normally 10 to 1000 nm Whether or not an ion-implanted layer has been formed may be determined by performing elemental analysis in an area having a depth of about 10 nm from the surface by X-ray photoelectron spectroscopy (XPS).

The shape of a formed article according to one embodiment of the invention is not particularly limited. For example, the formed article may be in the shape of a film, a sheet, a rectangular parallelepiped, a polygonal prism, a tube, or the like. When using the formed article as an electronic device member (described later), the formed article is preferably in the shape of a film or a sheet. The thickness of the film may be appropriately determined depending on the desired application of the electronic device.

The formed article according to one embodiment of the invention may include only the ion-implanted layer, or may also include an additional layer other than the ion-implanted layer. The additional layer may be a single layer, or may include a plurality of identical or different layers.

When the additional layer includes a plurality of layers, the plurality of layers may be stacked in an arbitrary order. The ion-implanted layer may be situated at an arbitrary position, but preferably forms the surface layer of the formed article from the viewpoint of production efficiency and the like. The ion-implanted layer may be formed on one side or each side of the additional layer. Examples of the additional layer include a base layer, an inorganic compound layer, an impact-absorbing layer, a conductive layer, a primer layer, and the like.

Base Layer

A material used for the base layer is not particularly limited insofar as the material is other than the polysilazane compound, and the target formed article can be obtained. Examples of the material used for the base layer include polyimides, polyamides, polyamideimides, polyphenylene ethers, polyether ketones, polyether ether ketones, polyolefins, polyesters, polycarbonates, polysulfones, polyether sulfones, polyphenylene sulfides, polyallylates, acrylic resins, cycloolefin polymers, aromatic polymers, and the like.

Among these, polyesters, polyamides, or cycloolefin polymers are preferable due to excellent transparency and versatility. It is more preferable to use polyesters or cycloolefin polymers.

Examples of the polyesters include polyethylene terephthalate, polybuthylene terephthalate, polyethylene naphthalate, polyallylate, and the like.

Examples of the polyamides include wholly aromatic polyamides, nylon 6, nylon 66, nylon copolymers, and the like.

Examples of the cycloolefin polymers include norbornene polymers, monocyclic olefin polymers, cyclic conjugated diene polymers, vinyl alicyclic hydrocarbon polymers, and hydrogenated products thereof. Specific examples of the cycloolefin polymers include APEL (ethylene-cycloolefin copolymer manufactured by Mitsui Chemicals Inc.), ARTON (norbornene polymer manufactured by JSR Corporation), ZEONOR (norbornene polymer manufactured by Zeon Corporation), and the like.

Inorganic Compound Layer

The inorganic compound layer includes one or more inorganic compounds. Examples of the inorganic compound that forms the inorganic layer include inorganic compounds that can be deposited under vacuum, and exhibit a gas barrier capability, such as inorganic oxides, inorganic nitrides, inorganic carbides, inorganic sulfides, and composites thereof (e.g., inorganic oxynitride, inorganic oxycarbide, inorganic carbonitride, and inorganic oxycarbonitride). Among these, it is preferable to use an inorganic oxide, an inorganic nitride, or an inorganic oxynitride.

Examples of the inorganic oxide include metal oxides shown by the formula MOx.

In the formula MOx, M represents a metal element. The range of x differs depending on M. For example, $x=0.1$ to 2.0 when M is silicon (Si), $x=0.1$ to 1.5 when M is aluminum (Al), $x=0.1$ to 1.0 when M is magnesium (Mg), $x=0.1$ to 1.0 when M is calcium (Ca), $x=0.1$ to 0.5 when M is potassium (K), $x=0.1$ to 2.0 when M is tin (Sn), $x=0.1$ to 0.5 when M is sodium (Na), $x=0.1$ to 1.5 when M is boron (B), $x=0.1$ to 2.0 when M is titanium (Ti), $x=0.1$ to 1.0 when M is lead (Pb), $x=0.1$ to 2.0 when M is zirconium (Zr), and $x=0.1$ to 1.5 when M is yttrium (Y).

Examples of the inorganic nitride include metal nitrides shown by the formula MNy.

In the formula MNy, M represents a metal element. The range of y differs depending on M. For example, $y=0.1$ to 1.3 when M is silicon (Si), $y=0.1$ to 1.1 when M is aluminum (Al), $y=0.1$ to 1.3 when M is titanium (Ti), and $y=0.1$ to 1.3 when M is tin (Sn).

Examples of the inorganic oxynitride include metal oxynitrides shown by the formula MOxNy.

In the formula MOxNy, M represents a metal element. The ranges of x and y differ depending on M. For example, $x=1.0$ to 2.0 and $y=0.1$ to 1.3 when M is silicon (Si), $x=0.5$ to 1.0 and $y=0.1$ to 1.0 when M is aluminum (Al), $x=0.1$ to 1.0 and $y=0.1$ to 0.6 when M is magnesium (Mg), $x=0.1$ to 1.0 and $y=0.1$ to 0.5 when M is calcium (Ca), $x=0.1$ to 0.5 and $y=0.1$ to 0.2 when M is potassium (K), $x=0.1$ to 2.0 and $y=0.1$ to 1.3 when M is tin (Sn), $x=0.1$ to 0.5 and $y=0.1$ to 0.2 when M is sodium (Na), $x=0.1$ to 1.0 and $y=0.1$ to 0.5 when M is boron (B), $x=0.1$ to 2.0 and $y=0.1$ to 1.3 when M is titanium (Ti), $x=0.1$ to 1.0 and $y=0.1$ to 0.5 when M is lead (Pb), $x=0.1$ to 2.0 and $y=0.1$ to 1.0 when M is zirconium (Zr), and $x=0.1$ to 1.5 and $y=0.1$ to 1.0 when M is yttrium (Y).

Note that the metal oxide, the metal nitride, and the metal oxynitride may include two or more metals.

The inorganic compound layer may be formed by an arbitrary method. For example, the inorganic compound layer may be formed by deposition, sputtering, ion plating, thermal CVD, plasma CVD, or the like. It is preferable to form the inorganic compound layer by sputtering since the inorganic compound layer can be easily formed.

When forming the inorganic compound layer by sputtering, a discharge gas (e.g., argon) is introduced into a vacuum chamber. A high-frequency voltage or a direct voltage is applied between an inorganic compound target and a substrate (e.g., plastic film) to generate plasma, and plasma collides against the target so that the target material adheres to the substrate to obtain a thin film. Examples of the target include the above metal oxides, metal nitrides, metal oxynitrides, and metals contained therein.

Examples of sputtering include two-electrode sputtering; three-electrode sputtering that further utilizes a hot cathode that discharges thermoelectrons; magnetron sputtering that stabilizes plasma and increases the deposition rate by applying a magnetic field to the surface of the target using a magnetic field generating means; ion-beam sputtering that applies high-energy ion beams to the target; facing target sputtering that applies a magnetic field perpendicularly to the surface of two targets disposed in parallel; ECR sputtering that utilizes electron cyclotron resonance (ECR); coaxial sputtering that coaxially disposes the target and the substrate in a cylindrical shape; reactive sputtering that supplies a reactive gas to the vicinity of the substrate, and controls the composition; and the like.

Among these, it is preferable to use magnetron sputtering since a laminate that exhibits an excellent gas barrier capability can be easily obtained.

The inorganic compound layer may also be formed by a dynamic ion mixing method.

The dynamic ion mixing method forms a compound film of a film-forming material and ion species by forming a film while implanting ions.

When using the dynamic ion mixing method, the composition and the crystals of the film can be easily controlled by changing the film-forming conditions and the ion implantation conditions. A film that has only a small number of pinholes and excellent mechanical properties can be deposited by optimizing the conditions. Moreover, some of the atoms of the film-forming material that have reached the surface of the substrate material receive energy due to collision with the ions implanted into the film in the initial stage of the film-forming process, and are knocked-on in the substrate material. A mixing layer of the atoms of the substrate material and the atoms of the film-forming material is thus formed at the interface between the substrate material and the film. The mixing layer has a structure in which the atoms of the film-forming material that have entered the substrate material as if to insert a wedge into the substrate material, and function as an anchor that secures the deposited film on the substrate material. Therefore, the deposited film strongly adheres to the substrate material. Specifically, the inorganic compound layer deposited by the dynamic ion mixing method strongly adheres to the polysilazane layer. Moreover, since the number of pinholes formed in the inorganic compound layer is small, an excellent gas barrier capability can be obtained, and cracks rarely occur when bending the inorganic compound layer, so that the gas barrier capability can be maintained for a long time.

When using the dynamic ion mixing method, it is preferable to form the inorganic compound layer by sputtering. In this case, the inorganic compound layer is formed as follows, for example.

Specifically, a substrate provided with a polysilazane layer and a target are disposed in a vacuum chamber. After reducing the pressure inside the vacuum chamber, a plasma-generating gas is introduced into the chamber. The plasma-generating gas includes a sputtering gas (rare gas), and optionally includes gas (reactive gas) other than the rare gas that undergoes ionization, and generates plasma when high-frequency electric power is applied to the substrate.

High-frequency electric power is then applied to the substrate while applying a high negative pulsed DC voltage. The plasma-generating gas generates plasma around the substrate due to the high-frequency electric power applied to the substrate, and the ions of the sputtering gas present in the plasma collide with the target, so that the sputtering particles fly out from the target. The sputtering particles adhere to (are deposited on) the surface of the polysilazane layer to form a deposited film (i.e., a film formed of the target material). The ions present in the plasma are attracted to the substrate due to the high negative pulsed DC voltage, and implanted into the deposited film (inorganic compound layer). Energy is thus applied to the atoms of the film, so that the atoms are knocked-on in the polysilazane layer. When using a reactive gas, the atoms of the film react with the ions of the reactive gas while the atoms are knocked-on in the polysilazane layer. As a result, a compound film (inorganic compound layer) of the target material and the reactive gas is formed to strongly adhere to the polysilazane layer.

When using the dynamic ion mixing method, an electrical charge of the substrate due to ion implantation can be removed by applying high-frequency electric power to the substrate.

The target and the plasma-generating gas are appropriately selected depending on the composition of the inorganic compound layer.

Specific examples of the target include the metal that forms the desired inorganic compound layer, silicon, graphite, metal-containing compounds (e.g., oxide, nitride, and oxynitride), and the like. When using the metal that forms the inorganic compound layer, silicon, or graphite as the target, the inorganic compound layer is formed using a plasma-generating gas including a reactive gas.

Examples of the sputtering gas include helium, argon, neon, krypton, xenon, and the like. These sputtering gases may be used either individually or in combination. Examples of the reactive gas include hydrogen, oxygen, nitrogen, fluorocarbon, and the like. These reactive gases may be used either individually or in combination.

When using reactive sputtering, it is preferable that the plasma-generating gas include a sputtering gas as the main component. The content rate of the sputtering gas in the plasma-generating gas is appropriately adjusted depending the compositional ratio of the target material and the desired film quality, but is preferably 50 to 100%, more preferably 55 to 98%, and particularly preferably 60 to 96%. This makes it possible to increase the deposition rate, so that the inorganic compound layer can be efficiently deposited.

The pressure of the plasma-generating gas (the total pressure when using a mixed gas) is preferably $1.0 \times 10$ to $1.0 \times 10^{-3}$ Pa, more preferably $1.0 \times 10^{0}$ to $1.0 \times 10^{-3}$ Pa, and particularly preferably $1.0 \times 10^{0}$ to $1.0 \times 10^{-2}$ Pa.

The high negative pulsed voltage applied to the substrate is preferably $-100$ kV to $-100$ V, and more preferably $-50$ kV to $-1$ kV.

The concentration of ions implanted into the film is normally $1 \times 10^{15}$ ions/cm$^2$ or more, preferably $1 \times 10^{16}$ ions/cm$^2$ or more, and more preferably $1 \times 10^{16}$ to $1 \times 10^{18}$ ions/cm$^2$.

The thickness of the inorganic compound layer is not particularly limited, but is preferably 10 to 1000 nm, more preferably 20 to 500 nm, and particularly preferably 50 to 200 nm. If the thickness of the inorganic compound layer is smaller than the above range, a sufficient gas barrier capability may not be obtained. If the thickness of the inorganic compound layer is larger than the above range, the transparency of the gas-barrier film may be impaired.

According to the gas-barrier film produced as described above, since the polysilazane layer is formed on the substrate, a situation in which the shape of elevations and depressions on the surface of the substrate appears can be prevented. Specifically, the gas-barrier film exhibits excellent surface flatness.

When the inorganic compound layer is deposited on the polysilazane layer by the dynamic ion mixing method, the inorganic compound layer exhibits excellent adhesion to the polysilazane layer, so that delamination of the inorganic compound layer from the polysilazane layer can be prevented.

The center-line average roughness (Ra) of the surface of the inorganic compound layer is not particularly limited, but is preferably 2.0 nm or less, and more preferably 1.0 nm or less. The term "center-line average roughness (Ra)" used herein refers to a value obtained by three-dimensionally applying a value defined in JIS B 0601 so that the value can be applied to the measurement plane (i.e., a value obtained by averaging the absolute value of the deviation from the reference plane to the measurement plane). The center-line average roughness (Ra) is given by the following expression.

[Expression 5]

$$Ra = \frac{1}{S_0} \int_{Y_B}^{Y_T} \int_{X_L}^{X_R} |F(X,Y) - Z_0| dX dY \quad (5)$$

where,
F(X, Y): A plane indicated by the measurement data
$S_0$: The area on the assumption that it is ideally flat from the specified plane
$Z_0$: The average value of the Z data in the specified plane
$Y_T$: The y-coordinate of the measurement end point
$Y_B$: The y-coordinate of the measurement start point
$X_R$: The x-coordinate of the measurement end point
$Y_L$: The x-coordinate of the measurement start point The center-line average roughness (Ra) is used as an index of the surface flatness of the inorganic compound layer. A small center-line average roughness (Ra) indicates that the inorganic compound layer has high surface flatness. If the center-line average roughness (Ra) of the inorganic compound layer is within the above range, a situation in which a protrusion is formed on an electrode film can be prevented (i.e., a disconnection or a short circuit due to such a protrusion can be prevented) even when applying the gas-barrier film to an electronic device having a configuration in which am electrode film is formed on the surface.

A process that forms the inorganic compound layer on the polysilazane layer by the dynamic ion mixing method is described below taking an example in which a silicon oxynitride layer is formed by the dynamic ion mixing method that utilizes sputtering.

Specifically, a substrate provided with a polysilazane layer is formed in a film transfer system provided in a chamber, and a silicon target is formed in the chamber. The substrate is formed so that the side on which the polysilazane layer is formed faces the target in the middle of the film transfer system. After reducing the pressure inside the chamber using a rotary pump and an oil diffusion pump, a plasma-generating gas is introduced into the chamber. In this example, a mixed gas of argon, nitrogen, and oxygen is used as the plasma-generating gas. High-frequency electric power is then applied to the substrate while applying a high pulsed DC voltage in a state in which the substrate is transferred. For example, a high-frequency electric power of 13.56 MHz that is pulse-modulated from 10 μs to 400 ms is applied to the substrate.

The plasma-generating gas generates plasma around the substrate due to the high-frequency electric power applied to the substrate, and the argon ions present in the plasma collide with the silicon target, so that the silicon particles fly out from the target. The silicon particles adhere to (are deposited on) the surface of the polysilazane compound-containing layer to form a deposited film. The ions present in the plasma are attracted to the substrate due to the high negative pulsed DC voltage, and implanted into the deposited film. The silicon atoms of the film receive the energy of the ions, and are knocked-on in the polysilazane compound-containing layer. The silicon atoms of the film react with the ions of the reactive gas (nitrogen and oxygen) to produce silicon oxynitride. As a result, a silicon oxynitride layer is formed to strongly adhere to the polysilazane layer.

The above deposition process is continuously performed along the longitudinal direction of the transferred substrate. A long gas-barrier film in which the polysilazane layer and the silicon oxynitride layer (inorganic compound layer) are sequentially stacked is thus obtained.

An inorganic compound layer normally exhibits a gas barrier capability. However, if the thickness of the inorganic compound layer is increased to a large extent in order to improve the gas barrier capability, the folding (bending) resistance and the transparency may decrease, and cracks may easily occur. Moreover, the weight of the resulting product may increase. Since the formed article according to one embodiment of the invention includes the ion-implanted layer in addition to the inorganic compound layer, the formed article exhibits an excellent gas barrier capability without increasing the thickness of the inorganic compound layer to a large extent.

Since the ion-implanted layer and the inorganic compound layer are directly stacked, the ion-implanted layer suppress a situation in which cracks occur in the inorganic compound layer, so that a laminate that exhibits excellent folding resistance and an excellent gas barrier capability can be obtained.

The number of implanted layers, the number of inorganic compound layers, and the arrangement thereof in the formed article according to one embodiment of the invention are not particularly limited. For example, when the formed article further includes a base layer, the ion-implanted layer and the inorganic compound layer may be formed on one side or each side of the base layer. Elevations and depressions (minute protrusions) on the surface of the base are covered by stacking the ion-implanted layer on the base layer, so that the flatness is improved. A situation in which pinholes are formed in the inorganic compound layer is suppressed by stacking the inorganic compound layer on the ion-implanted layer, so that a laminate that exhibits an excellent gas barrier capability is obtained. The inorganic compound may not adhere to the base layer depending on the type of the base layer. However, sufficient adhesion can be obtained by providing the ion-implanted layer between the base layer and the inorganic compound layer.

The formed article according to one embodiment of the invention that includes the inorganic compound layer as the additional layer exhibits an excellent gas barrier capability, excellent transparency, and excellent folding resistance (i.e., the formed article can be easily folded (bent) without causing cracks).

Impact-Absorbing Layer

The material used for the impact-absorbing layer is not particularly limited. Examples of the material used for the impact-absorbing layer include acrylic resins, urethane resins, silicone resins, olefin resins, rubber materials, and the like. Among these, acrylic resins, silicone resins, and rubber materials are preferable.

Examples of the acrylic resins include acrylic resins including at least one polymer selected from a (meth)acrylate homopolymer, a copolymer of two or more (meth)acrylate units, and a copolymer of a (meth)acrylate and another functional monomer as the main component. Note that the term "(meth)acrylic acid" refers to acrylic acid or methacrylic acid (hereinafter the same).

It is preferable to use a (meth)acrylate in which the ester moiety has 1 to 20 carbon atoms, and more preferably a (meth)acrylate in which the ester moiety has 4 to 10 carbon atoms, since the storage modulus of the impact-absorbing layer can be easily adjusted with a given range. Examples of the (meth)acrylate include butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, and the like.

Examples of the functional monomer include hydroxyl group-containing monomers such as hydroxyethyl (meth)acrylate, amide group-containing monomers such as (meth)acrylamide, carboxylic acid group-containing monomers such as (meth)acrylic acid, and the like.

The (meth)acrylate (co)polymer may be produced by solution polymerization, emulsion polymerization, suspension polymerization, or the like. Note that the term "(co)polymer" refers to a homopolymer or a copolymer (hereinafter the same).

The (meth)acrylate (co)polymer may be mixed with a crosslinking agent, and at least partially crosslinked.

Examples of the crosslinking agent include isocyanate crosslinking agents such as tolylene diisocyanate, hexamethylene diisocyanate, and adducts thereof; epoxy crosslinking agents such as ethylene glycol glycidyl ether; aziridine crosslinking agents such as hexa[1-(2-methyl)-aziridinyl] triphosphatriazine; chelate crosslinking agents such as aluminum chelates; and the like.

The crosslinking agent is used in an amount of 0.01 to 10 parts by mass, and preferably 0.05 to 5 parts by mass, based on 100 parts by mass (solid content) of the (meth)acrylate (co)polymer. These crosslinking agents may be used either individually or in combination.

Examples of the silicone resins include silicone resins including a dimethylsiloxane as the main component. Examples of the rubber materials include rubber materials including isoprene rubber, styrene-butadiene rubber, polyisobutylene rubber, styrene-butadiene-styrene rubber, or the like as the main component.

The impact-absorbing layer may include additives such as an antioxidant, a tackifier, a plasticizer, a UV absorber, a coloring agent, and an antistatic agent.

A product commercially available as a pressure-sensitive adhesive, a coating agent, a sealing material, or the like may also be used as the material for the impact-absorbing layer. It is preferable to use a pressure-sensitive adhesive (e.g., acrylic pressure-sensitive adhesive, silicone pressure-sensitive adhesive, or rubber pressure-sensitive adhesive).

The impact-absorbing layer may be formed by an arbitrary method. For example, the impact-absorbing layer may be formed by applying a solution that includes the material for the impact-absorbing layer and an optional component (e.g., solvent) to the layer on which the impact-absorbing layer is to be formed, drying the resulting film, and optionally heating the dried film in the same manner as in the case of forming the polysilazane compound-containing layer.

Alternatively, the impact-absorbing layer may be deposited on a release base, and transferred to the layer on which the impact-absorbing layer is to be formed.

The thickness of the impact-absorbing layer is normally 1 to 100 μm, and preferably 5 to 50 μm.

The impact-absorbing layer preferably has a storage modulus at 25° C. of $1\times10^2$ to $1\times10^9$ Pa, more preferably $1\times10^3$ to $1\times10^7$ Pa, and still more preferably $1\times10^4$ to $1\times10^6$ Pa. The storage modulus is measured by a torsional shear method at a frequency of 1 Hz using a dynamic viscoelasticity analyzer.

The formed article according to one embodiment of the invention that includes the impact-absorbing layer exhibits an excellent impact-absorbing capability, and cracks do not occur in the inorganic compound layer even if an impact is applied to the formed article (inorganic compound layer). This prevents a decrease in gas barrier capability due to cracks in each layer.

Conductor Layer

Examples of the material used for the conductor layer include a metal, an alloy, a metal oxide, an electrically conductive compound, a mixture thereof, and the like. Specific examples of the material used for the conductor layer include conductive metal oxides such as tin oxide, antimony-doped tin oxide (ATO), fluorine-doped tin oxide (FTO), zinc oxide, indium oxide, indium tin oxide (ITO), and indium zinc oxide (IZO); metals such as gold, silver, chromium, and nickel; a mixture of a metal and a conductive metallic oxide; inorganic conductive substances such as copper iodide and copper sulfide; organic conductive materials such as polyaniline, polythiophene, and polypyrrole; and the like. The conductor layer may be a laminate that includes a plurality of layers formed of these materials.

The conductor layer may or may not be transparent. A laminate that exhibits excellent transparency can be obtained when the conductor layer is transparent. It is preferable to form the conductor layer using a conductive metal oxide (particularly preferably ITO) from the viewpoint of transparency.

The conductor layer may be formed by an arbitrary method. For example, the conductor layer may be formed by deposition, sputtering, ion plating, thermal CVD, plasma CVD, or the like. It is preferable to form the conductor layer by sputtering since the conductor layer can be easily formed.

When forming the conductor layer by sputtering, a discharge gas (e.g., argon) is introduced into a vacuum chamber. A high-frequency voltage or a direct-current voltage is applied between a target and a substrate to generate plasma, and plasma collides against the target so that the target material splashes and adheres to the substrate to obtain a thin film. The target is formed of the material used to form the conductor layer.

The thickness of the conductor layer is appropriately selected depending on the application and the like. The thickness of the conductor layer is normally 10 nm to 50 μm, and preferably 20 nm to 20 μm.

The surface resistivity of the conductor layer is normally 1000 ohms/square or less.

The conductor layer may optionally be patterned. The conductor layer may be patterned by chemical etching (e.g., photolithography), physical etching using a laser or the like, vacuum deposition using a mask, sputtering using a mask, a lift-off method, printing, or the like.

Primer Layer

A primer layer improves the interlayer adhesion between the base layer and the ion-implanted layer or the polysilazane compound-containing layer. A gas-barrier film that exhibits excellent interlayer adhesion and surface flatness can be obtained by providing the primer layer.

An arbitrary material may be used to form the primer layer. Examples of the material may be used to form the primer layer include silicon-containing compounds; a photopolymerizable composition that includes a photopolymerizable compound formed of a photopolymerizable monomer and/or a photopolymerizable prepolymer, and an initiator that generates radicals at least due to visible light; resins such as a polyester resin, a polyurethane resin (particularly a two-component curable resin that includes an isocyanate compound and a polyacryl polyol, a polyester polyol, a polyether polyol, or the like), an acrylic resin, a polycarbonate resin, a vinyl chloride/vinyl acetate copolymer, a polyvinyl butyral resin, and a nitrocellulose resin; alkyl titanates; ethyleneimine; and the like These materials may be used either individually or in combination.

The primer layer may be formed by dissolving or dispersing the material used to form the primer layer in an appropriate solvent to prepare a primer layer-forming solution, applying the primer layer-forming solution to one side or each side of the base layer, drying the resulting film, and optionally heating the dried film.

The primer layer-forming solution may be applied to the base layer by a wet coating method. Examples of the wet coating method include dipping, roll coating, gravure coating, knife coating, air knife coating, roll knife coating, die coating, screen printing, spray coating, a gravure offset method, and the like.

The film formed using the primer layer-forming solution may be dried by hot-blast drying, heat roll drying, infrared irradiation, or the like. The thickness of the primer layer is normally 10 to 1000 nm.

Ions may be implanted into the primer layer in the same manner as in the case of forming the ion-implanted layer, and the ion-implanted layer may then be formed. A gas-barrier film that exhibits more excellent gas barrier capability can be obtained by implanting ions into the primer layer.

The total thickness of the formed article according to one embodiment of the invention is not particularly limited, and may be appropriately determined depending on the application of the resulting electronic device.

The formed article according to one embodiment of the invention exhibits an excellent gas barrier capability and excellent transparency. When the formed article is formed in the shape of a film or a sheet (hereinafter referred to as "film-shaped"), the formed article preferably exhibits excellent folding resistance, and maintains the gas barrier capability even if the formed article is folded (bent).

The formed article according to one embodiment of the invention exhibits an excellent gas barrier capability since the formed article has a low gas (e.g., water vapor) transmission rate. For example, the water vapor transmission rate of the formed article at a temperature of 40° C. and a relative humidity of 90% is preferably less than 0.50 g/m²/day, and more preferably 0.35 g/m²/day or less. The gas (e.g., water vapor) transmission rate of the formed article may be measured using a known gas transmission rate measuring apparatus.

The formed article according to one embodiment of the invention exhibits excellent transparency since the formed article has a high visible light transmittance. The visible light transmittance (wavelength: 550 nm) of the formed article is preferably 80% or more, and more preferably 85% or more.

The visible light transmittance of the formed article may be measured using a known visible light transmittance measuring apparatus.

Whether or not the formed article exhibits excellent folding resistance, and maintains the gas barrier capability when the formed article is folded may be determined by bending the film-shaped formed article, applying a pressure to the film-shaped formed article, and determining whether or not the fold area has deteriorated when unfolding the film-shaped formed article, and determining whether or not the water vapor transmission rate has decreased to a large extent. The film-shaped formed article according to one embodiment of the invention advantageously maintains the gas barrier capability as compared with an inorganic film having an identical thickness even when the formed article has been folded.

2) Method of Producing Formed Article

A method of producing a formed article according to one embodiment of the invention includes implanting ions into a polysilazane compound-containing layer of a formed article that includes the polysilazane compound-containing layer in its surface area.

It is preferable to implant ions into the polysilazane compound-containing layer while transferring a long formed body that includes the polysilazane compound-containing layer in its surface area in a given direction.

According to this method, ions can be implanted into a long formed body wound around a feed roll while transferring the formed body in a given direction, which can then be wound around a wind-up roll, for example. Therefore, an ion-implanted formed article can be continuously produced.

The long formed body is in the shape of a film. The formed body may include only the polysilazane compound-containing layer, or may also include an additional layer other than the polysilazane compound-containing layer. Examples of the additional layer include the layers described above.

The thickness of the formed body is preferably 1 to 500 μm, and more preferably 5 to 300 μm, from the viewpoint of winding/unwinding capability and transferability.

Ions may be implanted into the polysilazane compound-containing layer by an arbitrary method. It is preferable to form an ion-implanted layer in the surface area of the polysilazane compound-containing layer by plasma ion implantation.

Plasma ion implantation includes implanting ions present in plasma into the surface area in the polysilazane compound-containing layer by applying a negative high-voltage pulse to the formed body that includes the polysilazane compound-containing layer in its surface area and has been exposed to plasma.

As the plasma ion implantation method, it is preferable to use (A) a method that implants ions present in plasma generated by utilizing an external electric field into the surface area of the polysilazane compound-containing layer, or (B) a method that implants ions present in plasma generated due to an electric field produced by only applying a negative high-voltage pulse without using an external electric field to the polysilazane compound-containing layer into the surface area of the polysilazane compound-containing layer.

When using the method (A), it is preferable to set the ion implantation pressure (plasma ion implantation pressure) to 0.01 to 1 Pa. If the plasma ion implantation pressure is within the above range, a uniform ion-implanted layer can be formed conveniently and efficiently. This makes it possible to efficiently form an ion-implanted layer that exhibits transparency and a gas barrier capability.

The method (B) does not require increasing the degree of decompression, allows an easy operation, and significantly reduces the processing time. Moreover, the entire polysilazane compound-containing layer can be uniformly processed, and ions present in plasma can be continuously implanted into the surface area of the polysilazane compound-containing layer with high energy when applying a negative high-voltage pulse. The method (B) also has an advantage in that an excellent ion-implanted layer can be uniformly formed in the surface area of the polysilazane compound-containing layer by merely applying a negative high-voltage pulse to the polysilazane compound-containing layer without requiring a special means such as a high-frequency electric power supply (e.g., radio frequency (RF) power supply or microwave power supply).

When using the method (A) or (B), the pulse width when applying a negative high-voltage pulse (i.e., during ion implantation) is preferably 1 to 15 μs. If the pulse width is within the above range, a transparent and uniform ion-implanted layer can be formed more conveniently and efficiently.

The voltage applied when generating plasma is preferably −1 to −50 kV, more preferably −1 to −30 kV, and particularly preferably −5 to −20 kV. If the applied voltage is higher than −1 kV, the dose may be insufficient, so that the desired performance may not be obtained. If the applied voltage is lower than −50 kV, the formed article may be charged during ion implantation, or the formed article may be colored.

The ion species used for plasma ion implantation is the same as described above. It is more preferable to use ions of hydrogen, nitrogen, oxygen, argon, helium, neon, xenon, or krypton due to ease of ion implantation and a capability to form a formed article that exhibits transparency and an excellent gas barrier capability. It is more preferable to use ions of nitrogen, oxygen, argon, or helium.

A plasma ion implantation apparatus is used when implanting ions present in the plasma into the surface area of the polysilazane compound-containing layer.

Specific examples of the plasma ion implantation apparatus include (α) an apparatus that causes the polysilazane compound-containing layer (hereinafter may be referred to as "ion implantation target layer") to be evenly enclosed by plasma by superimposing high-frequency electric power on a feed-through that applies a negative high-voltage pulse to the ion implantation target layer so that ions present in the plasma are attracted, implanted, collide, and deposited (JP-A-2001-26887), (β) an apparatus that includes an antenna in a chamber, wherein high-frequency electric power is applied to generate plasma, positive and the negative pulses are alternately applied to the ion implantation target layer after plasma has reached an area around the ion implantation target layer, so that ions present in the plasma are attracted and implanted by heating the ion implantation target layer by causing electrons present in plasma to be attracted and collide due to the positive pulse, and applying the negative pulse while controlling the temperature by controlling the pulse factor (JP-A-2001-156013), (γ) a plasma ion implantation apparatus that generates plasma using an external electric field (e.g., microwave high-frequency electric power supply), and causes ions present in the plasma to be attracted and implanted by applying a high-voltage pulse, (δ) a plasma ion implantation apparatus that implants ions present in plasma generated due to only an electric field produced by applying a high-voltage pulse without using an external electric field, and the like.

It is preferable to use the plasma ion implantation apparatus (γ) or (δ) since the plasma ion implantation apparatus (γ) or (δ) allows a convenient operation, significantly reduces the processing time, and can be continuously used.

A method using the plasma ion implantation apparatus (γ) or (δ) is described in detail below with reference to the drawings.

Figure 1:
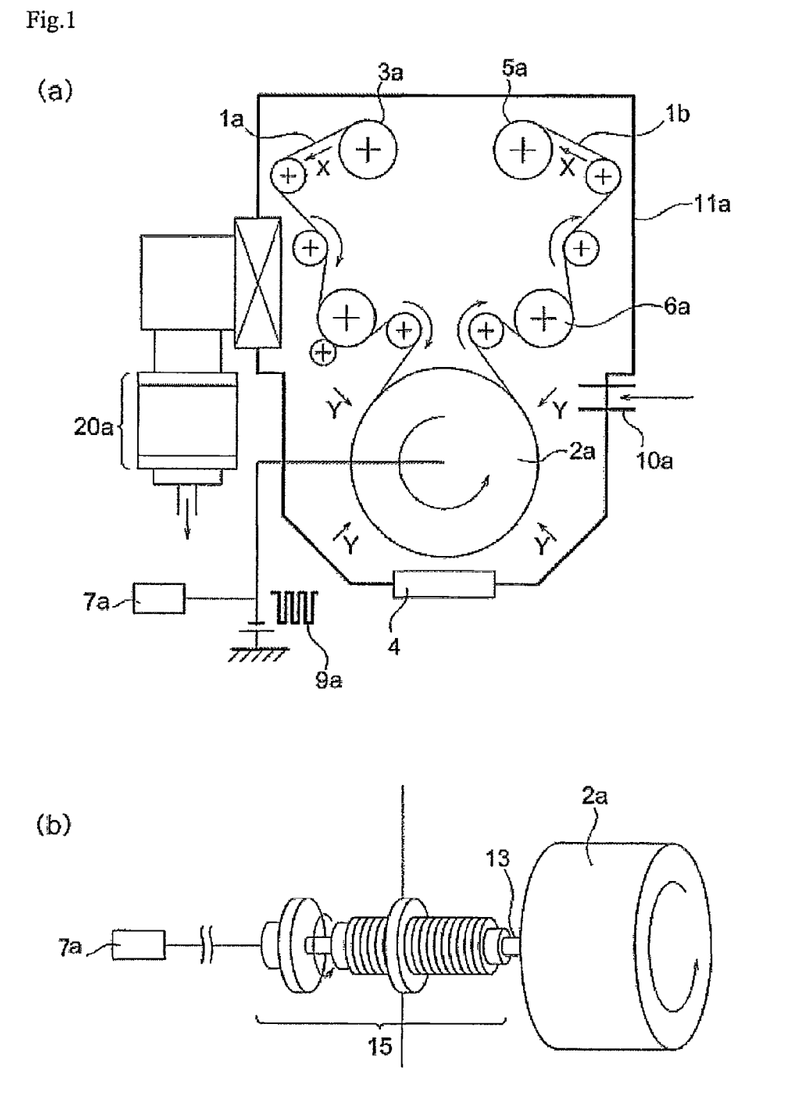
FIG. 1 is a view showing a schematic configuration of a plasma ion implantation apparatus.

FIG. 1 is a view schematically showing a continuous plasma ion implantation apparatus that includes the plasma ion implantation apparatus (γ).

In FIG. 1(a), reference sign 1a indicates a long film-shaped formed article (hereinafter referred to as "film") that includes a polysilazane compound-containing layer in its surface area, reference sign 11a indicates a chamber, reference sign 20a indicates a turbo-molecular pump, reference sign 3a indicates a feed roll around which the film 1a is wound before ion implantation, reference sign 5a indicates a wind-up roll around which an ion-implanted film (formed article) 1b is wound, reference sign 2a indicates a high-voltage applying rotary can, reference sign 6a indicates a transfer roll, reference sign 10a indicates a gas inlet, reference sign 7a indicates a high-voltage pulse power supply, and reference sign 4a indicates a plasma discharge electrode (external electric field) . FIG. 1(b) is a perspective view showing the high-voltage applying rotary can 2a, wherein reference numeral 15 indicates a high-voltage application terminal (feed-through).

The long film 1a that includes the polysilazane compound-containing layer in its surface area is a film in which a polysilazane compound-containing layer is formed on a base layer.

In the continuous plasma ion implantation apparatus shown in FIG. 1, the film 1a is transferred from the feed roll 3a in an arrow direction X inside the chamber 11a, passes through the high-voltage applying rotary can 2a, and is wound around the wind-up roll 5a. The film 1a may be wound and transferred by an arbitrary method. In one embodiment, the film 1a is transferred by rotating the high-voltage applying rotary can 2a at a constant speed. The high-voltage applying rotary can 2a is rotated by rotating a center shaft 13 of the high-voltage application terminal 15 using a motor.

The high-voltage application terminal 15, the transfer rolls 6a that come in contact with the film 1a, and the like are formed of an insulator. For example, the high-voltage application terminal 15, the transfer rolls 6a, and the like are formed by coating the surface of alumina with a resin (e.g., polytetrafluoroethylene). The high-voltage applying rotary can 2a is formed of a conductor (e.g., stainless steel).

The transfer speed of the film 1a may be appropriately set. The transfer speed of the film 1a is not particularly limited insofar as ions are implanted into the surface area (polysilazane compound-containing layer) of the film 1a so that the desired implanted layer is formed when the film 1a is transferred from the feed roll 3a and wound around the wind-up roll 5a. The film winding speed (line (transfer) speed) is determined depending on the applied voltage, the size of the apparatus, and the like, but is normally 0.1 to 3 m/min, and preferably 0.2 to 2.5 m/min.

The pressure inside the chamber 11a is reduced by discharging air from the chamber 11a using the turbo-molecular pump 20a connected to a rotary pump. The degree of decompression is normally $1\times10^{-4}$ to 1 Pa, and preferably $1\times10^{-3}$ to $1\times10^{-2}$ Pa.

An ion implantation gas (e.g., nitrogen) is then introduced into the chamber 11a through the gas inlet 10a so that the chamber 11a is filled with the ion implantation gas under reduced pressure. The ion implantation gas also serves as a plasma-generating gas.

Plasma is then generated using the plasma discharge electrode 4 (external electric field). The plasma may be generated by a known method (e.g., microwave or RF high-frequency electric power supply).

A negative high-voltage pulse 9a is applied from the high-voltage pulse power supply 7a connected to the high-voltage applying rotary can 2a through the high-voltage application terminal 15. When a negative high-voltage pulse is applied to the high-voltage applying rotary can 2a, ions present in plasma are attracted, and implanted into the surface area of the film around the high-voltage applying rotary can 2a (arrow Y in FIG. 1(a)) so that the film-shaped formed article 1b is obtained.

The pressure during ion implantation (i.e., the pressure of plasma gas inside the chamber 11a) is preferably 0.01 to 1 Pa. The pulse width during ion implantation is preferably 1 to 15 μs. The applied voltage when applying a negative high-voltage to the high-voltage applying rotary can 2a is preferably −1 to −50 kV.

Figure 2:
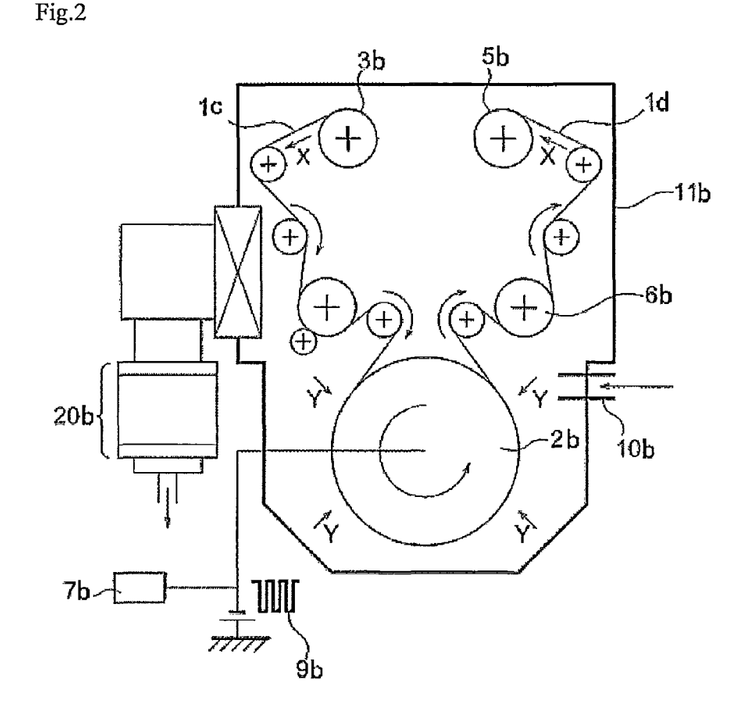
FIG. 2 is a view showing a schematic configuration of a plasma ion implantation apparatus.

A method of implanting ions into a polysilazane compound-containing layer of a film that includes the polysilazane compound-containing layer in its surface area using a continuous plasma ion implantation apparatus shown in FIG. 2 is described below.

The apparatus shown in FIG. 2 includes the plasma ion implantation apparatus (δ). The plasma ion implantation apparatus (δ) generates plasma by applying an electric field due to only a high-voltage pulse without using an external electric field (i.e., the plasma discharge electrode 4 shown in FIG. 1).

In the continuous plasma ion implantation apparatus shown in FIG. 2, a film 1c (film-shaped formed body) is transferred in an arrow direction X from a feed roll 3b shown in FIG. 2 by rotating a high-voltage applying rotary can 2b, and wound around a wind-up roll 5b in the same manner as the apparatus shown in FIG. 1.

The continuous plasma ion implantation apparatus shown in FIG. 2 implants ions into the surface area of the polysilazane compound-containing layer of the film as follows.

The film 1c is placed in a chamber 11b in the same manner as the plasma ion implantation apparatus shown in FIG. 1. The pressure inside the chamber 11b is reduced by discharging air from the chamber 11b using a turbo-molecular pump 20b connected to a rotary pump. An ion implantation gas (e.g., nitrogen) is introduced into the chamber 11b through a gas inlet 10b so that the chamber 11b is filled with the ion implantation gas under reduced pressure.

The pressure during ion implantation (i.e., the pressure of plasma gas inside the chamber 11b) is 10 Pa or less, preferably 0.01 to 5 Pa, and more preferably 0.01 to 1 Pa.

A high-voltage pulse 9b is applied from a high-voltage pulse power supply 7b connected to the high-voltage applying rotary can 2b through a high-voltage application terminal (not shown) while transferring the film 1c in the direction X shown in FIG. 2.

When a negative high-voltage pulse is applied to the high-voltage applying rotary can 2b, plasma is generated along the film 1c positioned around the high-voltage applying rotary can 2b, and ions present in plasma are attracted, and implanted into the surface area of the film 1c around the high-voltage applying rotary can 2b (arrow Y in FIG. 2). When ions have been implanted into the surface area of the polysilazane compound-containing layer of the film 1c, an implanted layer is formed in the surface area of the film. A film-shaped formed article 1d is thus obtained.

The applied voltage and the pulse width employed when applying a negative high-voltage pulse to the high-voltage applying rotary can 2b, and the pressure employed during ion implantation are the same as those employed when using the continuous plasma ion implantation apparatus shown in FIG. 1.

In the plasma ion implantation apparatus shown in FIG. 2, since the high-voltage pulse power supply also serves as a plasma generation means, a special means such as a high-frequency electric power supply (e.g., RF power supply or microwave power supply) is unnecessary. An ion-implanted layer can be continuously formed by implanting ions present in plasma into the surface area of the polysilazane compound-containing layer by merely applying a negative high-voltage pulse. Therefore, a formed article in which an ion-implanted layer is formed in the surface area of a film can be mass-produced.

3) Electronic Device Member and Electronic Device

An electronic device member according to one embodiment of the invention includes the formed article according to one embodiment of the invention. Therefore, the electronic device member according to one embodiment of the invention exhibits an excellent gas barrier capability, so that a deterioration in the element (member) due to gas (e.g., water vapor) can be prevented. Since the electronic device member exhibits excellent light transmittance, the electronic device member may be suitably used as a display member for liquid crystal displays, electroluminescence displays, and the like; a solar battery backsheet; and the like.

An electronic device according to one embodiment of the invention includes the electronic device member according to one embodiment of the invention. Specific examples of the electronic device include a liquid crystal display, an organic EL display, an inorganic EL display, electronic paper, a solar battery, and the like.

Since the electronic device according to one embodiment of the invention includes the electronic device member that includes the formed article according to one embodiment of the invention, the electronic device exhibits an excellent gas barrier capability and excellent transparency.

EXAMPLES

The invention is further described below by way of examples. Note that the invention is not limited to the following examples.

An X-ray photoelectron spectroscopy (XPS) measuring apparatus, measuring method of film density by X-ray reflected method, a plasma ion implantation apparatus, a water vapor transmission rate measuring apparatus, water vapor transmission rate measurement conditions, a visible light transmittance measuring apparatus, and a folding test method used in the examples are as follows. An apparatus that implants ions using an external electric field was used as the plasma ion implantation apparatus.

X-Ray Photoelectron Spectroscopy Measuring Apparatus

The oxygen atom content rate, the nitrogen atom content rate, and the silicon atom content rate in the surface layer part of the gas barrier layer (i.e., a layer obtained by ion implantation) were measured under the following conditions.
Measuring apparatus: "PHI Quantera SXM" manufactured by ULVAC-PHI, Incorporated
X-ray source: AlKα
X-ray beam diameter: 100 μm
Electric power: 25 W
Voltage: 15 kV
Take-off angle: 45°
Degree of vacuum: $5.0 \times 10^{-8}$ Pa Measuring Method of Film Density by X-Ray Reflected Method The X-ray reflectance was measured under the following measurement conditions to determine the total reflection critical angle θc, and the film density of the surface layer part of the gas barrier layer was calculated from the total reflection critical angle θc.

The following measuring apparatus and measurement conditions were used. Measuring apparatus: X-ray diffractometer "SmartLab" (manufactured by Rigaku Corporation)
Measurement Conditions
X-ray source: Cu-Kα1 (wavelength: 1.54059 angstroms)
Optical system: parallel beam optical system
Incident-side slit system: Ge(220)2 crystal, height-limiting slit: 5 mm, incident slit: 0.05 mm
Receiving-side slit system: receiving slit: 0.10 mm, soller slit: 5°
Detector: scintillation counter
Tube voltage-tube current: 45 kV-200 mA
Scan axis: 2θ/θ
Scanning mode: continuous scan
Scan range: 0.1 to 3.0 deg.
Scan speed: 1 deg/min
Sampling interval: 0.002°/step The oxygen atom content rate, the nitrogen atom content rate, and the silicon atom content rate in the surface layer part of the gas barrier layer measured by X-ray photoelectron spectroscopy were used for the atomic number ratio (xi).

Plasma Ion Implantation Apparatus
RF power supply: "RF56000" manufactured by JEOL Ltd.
High-voltage pulse power supply: "PV-3-HSHV-0835" manufactured by Kurita Seisakusho Co., Ltd.

Measurement of Water Vapor Transmission Rate

The water vapor transmission rate was measured using a transmission rate tester "L89-500" (manufactured by LYSSY) (when the water vapor transmission rate was 0.01 g/m²/day or more) or "deltaperm" (manufactured by TECHNOLOX) (when the water vapor transmission rate was less than 0.01 g/m²/day).

Measurement conditions: relative humidity: 90%, temperature: 40° C.

Measurement of Visible Light Transmittance
Measuring apparatus: UV-3101PC (manufactured by Shimadzu Corporation)
Measurement conditions: wavelength: 550 nm Folding Test The formed article was folded at the center so that the ion-implanted surface (the surface of the perhydropolysilazane-containing layer in Comparative Example 1, and the surface of the silicon nitride film in Comparative Example 3) was positioned outside. The formed article was passed between two rolls of a laminator ("LAMIPACKER LPC1502" manufactured by Fujipla, Inc.) at a laminating speed of 5 m/min and a temperature of 23° C. The folded area was observed using a microscope (magnification: 100) to determine the presence or absence of cracks. A case where cracks were not observed is indicated by "None", and a case where cracks were observed is indicated by "Occurred".

The following material A or B was used as the polysilazane compound.
A: Coating agent containing perhydropolysilazane as the main component ("Aquamika NL110-20" manufactured by Clariant Japan K.K.)
B: Coating agent containing a mixture of an organopolysilazane compound having a saturated hydrocarbon group as the main component ("tutoProm Bright" manufactured by Clariant Japan K.K.)

Example 1

The polysilazane compound A was applied to a polyethylene terephthalate film ("PET38T-100" manufactured by Mitsubishi Plastics Inc., thickness: 38 μm, hereinafter referred to as "PET film") (base layer), and heated at 120° C. for 1 minute to form a perhydropolysilazane-containing layer (thickness: 60 nm) on the PET film. A molded product was thus obtained. Argon (Ar) ions were then implanted into the surface of the perhydropolysilazane-containing layer using the plasma ion implantation apparatus shown in FIG. 1 to obtain a formed article 1.

The following plasma ion implantation conditions were used.
Plasma-generating gas: Ar
Gas flow rate: 100 sccm
Duty ratio: 0.5%
Repetition frequency: 1000 Hz
Applied voltage: −10 kV
RF power supply: frequency: 13.56 MHz, applied electric power: 1000 W
Chamber internal pressure: 0.2 Pa
Pulse width: 5 μs
Processing time (ion implantation time): 5 minutes
Line (transfer) speed: 0.2 m/min

Example 2

A formed article 2 was obtained in the same manner as in Example 1, except for changing the heating time from 1 minute to 5 minutes.

Example 3

A formed article 3 was obtained in the same manner as in Example 2, except for changing the thickness of the perhydropolysilazane-containing layer formed on the PET film from 60 nm to 100 nm.

Example 4

A formed article 4 was obtained in the same manner as in Example 2, except for changing the thickness of the perhydropolysilazane-containing layer formed on the PET film from 60 nm to 150 nm.

Example 5

A formed article 5 was obtained in the same manner as in Example 1, except for changing the heating time from 1 minute to 20 minutes.

Example 6

A formed article 6 was obtained in the same manner as in Example 2, except for using nitrogen ($N_2$) as the plasma-generating gas instead of argon.

Example 7

A formed article 7 was obtained in the same manner as in Example 2, except for changing the applied voltage during ion implantation from −10 kV to −5 kV.

Example 8

A formed article 8 was obtained in the same manner as in Example 2, except for changing the applied voltage during ion implantation from −10 kV to −15 kV.

Example 9

A formed article 9 was obtained in the same manner as in Example 2, except for using the polysilazane compound B instead of the polysilazane compound A.

Example 10

A formed article 10 was obtained in the same manner as in Example 2, except for using hydrogen ($H_2$) as the plasma-generating gas instead of argon.

Example 11

A formed article 11 was obtained in the same manner as in Example 2, except for using oxygen ($O_2$) as the plasma-generating gas instead of argon.

Example 12

A formed article 12 was obtained in the same manner as in Example 2, except for using helium (He) as the plasma-generating gas instead of argon.

Example 13

A formed article 13 was obtained in the same manner as in Example 2, except for using neon (Ne) as the plasma-generating gas instead of argon.

Example 14

A formed article 14 was obtained in the same manner as in Example 2, except for using xenon (Xe) as the plasma-generating gas instead of argon.

Example 15

A formed article 15 was obtained in the same manner as in Example 2, except for using krypton (Kr) as the plasma-generating gas instead of argon.

Comparative Example 1

A formed article was obtained in the same manner as in Example 1, except that ion implantation was not performed. Specifically, a perhydropolysilazane-containing layer was formed on the PET film to obtain a formed article 16.

Comparative Example 2

A formed article was obtained in the same manner as in Example 1, except for the perhydropolysilazane-containing layer was not formed on the PET film Specifically, argon ions were implanted into the surface of the PET film to obtain a formed article 17.

Comparative Example 3

A silicon nitride (SiN) film (thickness: 60 nm) was formed on a PET film by sputtering to obtain a formed article 18.

Comparative Example 4

The perhydropolysilazane-containing layer of the formed body obtained in Example 2 was subjected to a plasma treatment using argon (Ar) (plasma-generating gas) to obtain a formed article 19. The plasma treatment was performed in a state in which plasma ion implantation did not occur by setting the applied voltage of the apparatus to 0 kV.

The following plasma treatment conditions were used.
Plasma-generating gas: Ar
Gas flow rate: 100 sccm
Duty ratio: 0.5%
Repetition frequency: 1000 Hz
Applied voltage: 0 kV
RF power supply: frequency: 13.56 MHz, applied electric power: 1000 W
Chamber internal pressure: 0.2 Pa
Pulse width: 5 μs
Processing time (ion implantation time): 5 minutes
Line (transfer) speed: 0.2 m/min Comparative Example 5

A formed article 20 was obtained in the same manner as in Comparative Example 4, except for using oxygen ($O_2$) as the plasma-generating gas.

In Examples 1 to 5, 7 to 9, and 11 to 15, and Comparative Example 2, implantation of ions was confirmed by subjecting the surface area (depth: about 10 nm or less) to elemental analysis using an XPS system (manufactured by ULVAC-PHI, Incorporated).

In Example 6, it was difficult to distinguish nitrogen contained in the polysilazane compound from the implanted nitrogen ions. In Examples 10 and 12, the implanted ions could not be detected by XPS. However, it is obvious that ions were implanted since the same operation as in other examples was performed, implantation of ions was confirmed in other examples, and the gas barrier capability was improved, for example.

Table 1 shows the type of the polysilazane compound, the heating time (min) employed when obtaining the formed body, the thickness (nm) of the resulting layer, the type of the plasma-generating gas, and the applied voltage (kV) used in each example and comparative example.

The oxygen atom content, the nitrogen atom content, the silicon atom content (excluding the formed article 17), the film density (excluding the formed article 17), the water vapor transmission rate, and the total light transmittance of the formed articles 1 to 20 obtained in Examples 1 to 15 and Comparative Examples 1 to 5 were measured. The measurement results are shown in Table 1.

The presence or absence of cracks in the formed articles 1 to 20 obtained in Examples 1 to 15 and Comparative Examples 1 to 5 was determined by performing the folding test. The results are shown in Table 1.

The water vapor transmission rate of the formed articles 1 to 20 was also measured after the folding test. The results are shown in Table 1.

TABLE 1

| | Heating time (min) | Thickness (nm) | Plasma-generating gas | Applied voltage (kV) | Polysilazane compound | Formed article | Content rate (%) Oxygen atom | Content rate (%) Nitrogen atom |
|---|---|---|---|---|---|---|---|---|
| Example 1 | 1 | 60 | Ar | −10 | A | 1 | 63.22 | 7.21 |
| Example 2 | 5 | 60 | Ar | −10 | A | 2 | 63.05 | 5.89 |
| Example 3 | 5 | 100 | Ar | −10 | A | 3 | 63.21 | 5.69 |
| Example 4 | 5 | 150 | Ar | −10 | A | 4 | 63.10 | 5.36 |
| Example 5 | 20 | 60 | Ar | −10 | A | 5 | 63.54 | 5.13 |
| Example 6 | 5 | 60 | $N_2$ | −10 | A | 6 | 69.51 | 1.40 |
| Example 7 | 5 | 60 | Ar | −5 | A | 7 | 67.68 | 2.47 |
| Example 8 | 5 | 60 | Ar | −15 | A | 8 | 69.01 | 0.15 |
| Example 9 | 5 | 60 | Ar | −10 | B | 9 | 60.58 | 5.21 |
| Example 10 | 5 | 60 | $H_2$ | −10 | A | 10 | 71.00 | 0.19 |
| Example 11 | 5 | 60 | $O_2$ | −10 | A | 11 | 68.21 | 2.22 |
| Example 12 | 5 | 60 | He | −10 | A | 12 | 71.60 | 0.68 |
| Example 13 | 5 | 60 | Ne | −10 | A | 13 | 70.22 | 1.67 |
| Example 14 | 5 | 60 | Xe | −10 | A | 14 | 65.82 | 4.73 |
| Example 15 | 5 | 60 | Kr | −10 | A | 15 | 66.80 | 3.59 |
| Comparative Example 1 | 1 | 60 | — | — | A | 16 | 63.32 | 4.20 |
| Comparative Example 2 | — | — | Ar | −10 | — | 17 | — | — |
| Comparative Example 3 | — | (60) | — | — | (SiN) | 18 | 64.78 | 0.01 |
| Comparative Example 4 | 5 | 60 | Ar | 0 | A | 19 | 57.11 | 12.86 |
| Comparative Example 5 | 5 | 60 | $O_2$ | 0 | A | 20 | 59.02 | 11.17 |

| | Content rate (%) Silicon atom | Film density (g/cm³) | Total light transmittance (%) | Water vapor transmission rate (g/m²/day) Before folding test | Water vapor transmission rate (g/m²/day) After folding test | Cracks |
|---|---|---|---|---|---|---|
| Example 1 | 29.57 | 2.60 | 90 | 0.20 | 0.32 | None |
| Example 2 | 31.06 | 3.28 | 90 | 0.03 | 0.07 | None |
| Example 3 | 31.10 | 3.37 | 90 | 0.0065 | 0.01 | None |
| Example 4 | 31.54 | 3.56 | 90 | 0.0059 | 0.01 | None |
| Example 5 | 31.33 | 3.19 | 90 | 0.03 | 0.08 | None |
| Example 6 | 29.09 | 3.32 | 90 | 0.04 | 0.08 | None |
| Example 7 | 29.85 | 2.76 | 91 | 0.05 | 0.07 | None |
| Example 8 | 30.84 | 3.02 | 89 | 0.01 | 0.08 | None |

TABLE 1-continued

| | | | | | | |
|---|---|---|---|---|---|---|
| Example 9 | 34.21 | 2.54 | 88 | 0.07 | 0.08 | None |
| Example 10 | 28.81 | 2.71 | 90 | 0.07 | 0.08 | None |
| Example 11 | 29.57 | 3.15 | 90 | 0.05 | 0.09 | None |
| Example 12 | 27.72 | 2.63 | 89 | 0.05 | 0.07 | None |
| Example 13 | 28.11 | 2.70 | 90 | 0.05 | 0.07 | None |
| Example 14 | 29.45 | 2.91 | 90 | 0.07 | 0.09 | None |
| Example 15 | 29.61 | 2.89 | 90 | 0.08 | 0.10 | None |
| Comparative Example 1 | 32.48 | 1.63 | 92 | 10.32 | 10.92 | None |
| Comparative Example 2 | — | 1.51 | 71 | 7.98 | 8.07 | None |
| Comparative Example 3 | 35.21 | 2.30 | 71 | 0.25 | 1.21 | Occurred (broke) |
| Comparative Example 4 | 30.03 | 2.21 | 92 | 12.58 | 13.55 | None |
| Comparative Example 5 | 29.81 | 2.37 | 92 | 12.21 | 12.91 | None |

As shown in Table 1, the formed articles 1 to 15 obtained in Examples 1 to 15 having an oxygen atom content rate of 60 to 75%, a nitrogen atom content rate of 0 to 10%, and a silicon atom content rate of 25 to 35%, based on the total content of oxygen atoms, nitrogen atoms, and silicon atoms, and having a film density of 2.4 to 4.0 g/cm$^3$, exhibited a small water vapor transmission rate and a high gas barrier capability as compared with the formed articles 16 to 20 obtained in Comparative Examples 1 to 5 that did not satisfy the above requirements. The formed articles 1 to 15 obtained in Examples 1 to 15 exhibited high total light transmittance and excellent transparency.

No cracks were observed in the formed articles 1 to 15 obtained in Examples 1 to 15 after the folding test. The formed articles 1 to 15 obtained in Examples 1 to 15 showed a small increase in water vapor transmission rate as compared with the formed article of Comparative Example 3 in which the inorganic film (silicon nitride film) was formed. The formed articles 1 to 15 obtained in Examples 1 to 15 had excellent folding resistance.

LIST OF REFERENCE SYMBOLS 1a, 1c: Film-shaped formed body
1b, 1d: Film-shaped formed article
2a, 2b: Rotary can
3a, 3b: Feed roll
4: Plasma discharge electrode
5a, 5b: Wind-up roll
6a, 6b: Transfer roll
7a, 7b: Pulse power supply
9a, 9b: High-voltage pulse
10a, 10b: Gas inlet
11a, 11b: Chamber
13: Center shaft
15: High-voltage application terminal
20a, 20b: Turbo-molecular pump

The invention claimed is:

1. A formed article comprising a gas barrier layer that is formed of a material including at least an oxygen atom, a nitrogen atom, and a silicon atom, an area from the surface to a point 5 nm deep from the surface of the gas barrier layer having an oxygen atom content rate of 60 to 75%, a nitrogen atom content rate of 0.1 to 10%, and a silicon atom content rate of 25 to 35%, based on the total content of oxygen atoms, nitrogen atoms, and silicon atoms, and the area from the surface to the point 5 nm deep from the surface of the gas barrier layer having a film density of 2.4 to 4.0 g/cm$^3$.

2. The formed article according to claim 1, comprising a layer obtained by implanting ions into a layer containing a polysilazane compound in an amount of 50 wt % or more.

3. The formed article according to claim 2, wherein the ions have been obtained by ionizing at least one gas selected from the group consisting of hydrogen gas, nitrogen gas, oxygen gas, argon gas, helium gas, neon gas, xenon gas, and krypton gas.

4. The formed article according to claim 2, wherein the having a layer obtained by subjecting a layer containing a polysilazane compound in an amount of 50 wt % or more to plasma ion implantation.

5. The formed article according to claim 2, wherein the polysilazane compound is a perhydropolysilazane.

6. The formed article according to claim 1, the formed article having a water vapor transmission rate at a temperature of 40° C. and a relative humidity of 90% of less than 0.50 g/m$^2$/day.

7. The formed article according to claim 1, wherein the oxygen atom content rate in the area from the surface to the point 5 nm deep from the surface of the gas barrier layer is 63 to 70%.

8. The formed article according to claim 1, wherein the nitrogen atom content rate in the area from the surface to the point 5 nm deep from the surface of the gas barrier layer is 0.1 to 6%.

9. The formed article according to claim 1, wherein the silicon atom content rate in the area from the surface to the point 5 nm deep from the surface of the gas barrier layer is 29 to 32%.

10. The formed article according to claim 1, having a layer obtained by implanting ions in a layer containing a polysilazane compound in an amount of 50 wt % or more, on one side or both sides of the base layer.

11. The formed article according to claim 1, wherein a material used for the base layer is selected from the group consisting of polyimides, polyamides, polyamideimides, polyphenylene ethers, polyether ketones, polyether ether ketones, polyolefins, polyesters, polycarbonates, polysulfones, polyether sulfones, polyphenylene sulfides, polyallylates, acrylic resins, cycloolefin polymers, and aromatic polymers.

12. The formed article according to claim 1, having a light transmittance at a wavelength of 550 nm of 80% or more.

13. The formed article according to claim 1, having a shape of a film or a sheet.

* * * * *